(12) United States Patent
Oropeza

(10) Patent No.: US 9,969,598 B1
(45) Date of Patent: May 15, 2018

(54) HOOK AND CHAIN ASSEMBLIES AND METHODS OF MAKING SUCH

(71) Applicant: Jesus R. Oropeza, Yuma, AZ (US)

(72) Inventor: Jesus R. Oropeza, Yuma, AZ (US)

( * ) Notice: Subject to any disclaimer, the term of this patent is extended or adjusted under 35 U.S.C. 154(b) by 0 days. days.

(21) Appl. No.: 15/831,592

(22) Filed: Dec. 5, 2017

(51) Int. Cl.
| | | |
|---|---|---|
| B66C 1/00 | (2006.01) | |
| B66C 1/34 | (2006.01) | |
| B65G 17/16 | (2006.01) | |
| B65G 17/40 | (2006.01) | |
| B66C 1/12 | (2006.01) | |
| F16G 15/04 | (2006.01) | |
| B66C 1/14 | (2006.01) | |

(52) U.S. Cl.
CPC ............... B66C 1/34 (2013.01); B65G 17/16 (2013.01); B65G 17/40 (2013.01); *B65G 2201/0202* (2013.01); *B66C 1/125* (2013.01); *B66C 1/14* (2013.01); *F16G 15/04* (2013.01)

(58) Field of Classification Search
CPC .. B66C 1/34; B66C 1/125; B66C 1/14; B66C 1/12; B66C 1/66; B66C 1/40; B65G 17/16; B65G 17/40; B65G 2201/0202; F16G 15/04; F16G 11/143; F16B 45/00; E21B 19/04; B63B 21/58; A62B 1/02
USPC ............................................. 294/82.11, 82.1
See application file for complete search history.

(56) References Cited

U.S. PATENT DOCUMENTS

| | | | | |
|---|---|---|---|---|
| 1,493,285 A | * | 5/1924 | Scafe ...................... | F16G 11/10 403/353 |
| 1,533,555 A | * | 4/1925 | Howard .................... | B66C 1/34 403/213 |
| 2,174,192 A | * | 9/1939 | Meighan ................. | F16G 11/00 24/129 R |
| 2,384,497 A | * | 9/1945 | Siler ........................ | B66C 1/34 294/74 |
| 2,630,610 A | * | 3/1953 | Lock ........................ | B66C 1/34 24/116 R |
| 2,903,767 A | | 9/1959 | Huber | |
| 2,942,315 A | * | 6/1960 | Johnson ................ | F16G 11/106 24/134 R |
| 3,318,575 A | | 5/1967 | Hawkins et al. | |
| 3,707,022 A | * | 12/1972 | Diehl .................... | F16G 11/046 188/65.5 |
| 3,888,448 A | * | 6/1975 | Rowland ............. | A61M 5/1415 24/129 R |
| 4,076,430 A | | 2/1978 | Crook, Jr. | |
| 4,723,804 A | * | 2/1988 | Gatens ...................... | B66C 1/34 294/82.11 |
| 4,948,098 A | | 8/1990 | Nishimura | |
| 6,568,165 B2 | | 5/2003 | Smetz | |
| 6,941,622 B1 | | 9/2005 | Hung | |
| 2002/0112463 A1 | * | 8/2002 | Smetz ..................... | B66C 1/125 59/93 |

(Continued)

FOREIGN PATENT DOCUMENTS

| | | | | |
|---|---|---|---|---|
| FR | 2427508 A1 | * 12/1979 | ............. | B60R 9/048 |
| GB | 2151328 A | * 7/1985 | ............. | F16G 13/12 |
| WO | WO-2004087554 A1 | * 10/2004 | ............. | B66C 1/125 |

*Primary Examiner* — Gabriela M Puig

(74) *Attorney, Agent, or Firm* — Snell & Wilmer L.L.P.

(57) ABSTRACT

The present disclosure is directed to hook and chain assemblies, including those suitable for use in food processing environments. The chain passes through a hook body, where it is secured by a retaining pin when under tension or load. The chain can be quickly and easily removed for servicing, cleaning, and sanitation of the hook body.

16 Claims, 3 Drawing Sheets

(56) References Cited

U.S. PATENT DOCUMENTS

2006/0213177 A1\* 9/2006 Fredriksson ............ B66C 1/125
59/93

\* cited by examiner

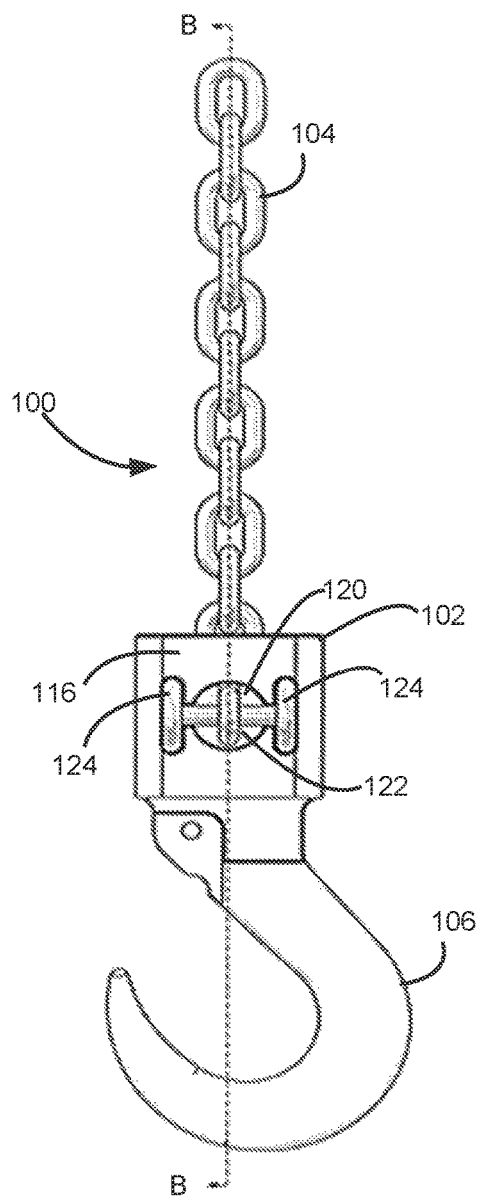
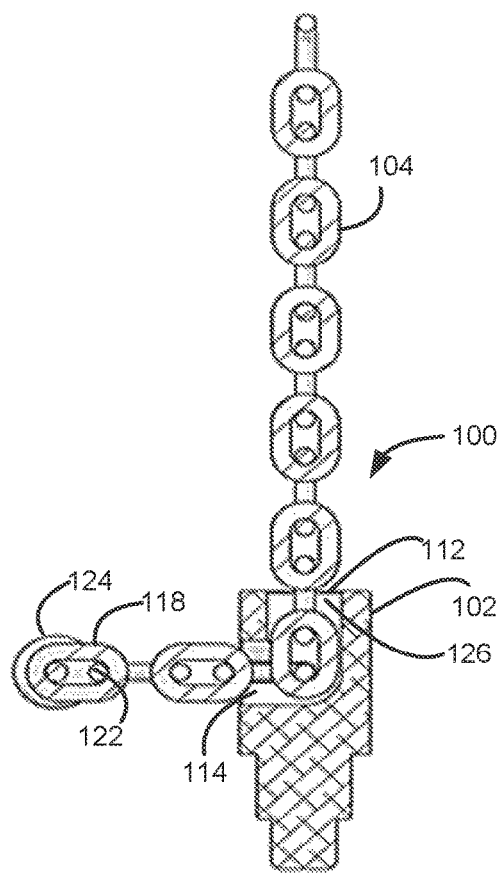
FIG 3A
FIG 3B
SECTION B-B

HOOK AND CHAIN ASSEMBLIES AND METHODS OF MAKING SUCH

FIELD

The present disclosure generally relates to hook and chain assemblies, and more particularly, to assemblies having chains secured within hook bodies by retaining elements.

BACKGROUND

Various industries, such as the food processing industry, require lifting, supporting, and transporting of heavy objects and apparatus. Frequently, hoists, overhead cranes, and other mechanisms for lifting, supporting, and transporting heavy loads utilize hook and chain systems to engage and control the heavy load. In the food processing industry, for example, heavy loads (such as industrial food baskets) are transported along various processing stations and operations via a hook and chain assembly of a hoist or crane. Such hook and chain assemblies should be food safe.

Hooks can be difficult to clean and sanitize. For example, cleaning and sanitizing hooks can require the hook to be removed from surface and at least partially disassembled so a sufficient cleaning and sanitizing operation can be performed on the hook. Cleaning and sanitizing of hooks used in human and pet food processing industries is of particular importance, as hooks may foster toxins or microorganisms that can negatively impact the food articles. Therefore, it is beneficial to have a hook and chain that is relatively easy to clean and sanitize, preferably without removing the hook or chain from operation for an extended period of time to perform the cleaning or sanitizing operation.

SUMMARY

The present disclosure includes a chain and hook assembly comprising a chain having a link, a retaining pin positioned within the link and having two enlarged diameter ends, a hook body comprising a top surface, a bottom surface, and a side surface, wherein the top surface comprises a chain opening through which the chain passes, wherein the side surface comprises a pin opening having a central cavity with a dimension larger than the width of the link, and a first cavity and a second cavity each having a shape and configuration corresponding to the shape of the enlarged diameter ends, and wherein the hook body further comprises a channel connecting the chain opening and the central cavity.

The assembly can have a hook coupled to the bottom surface of the hook body, which can comprise a food-safe metal, including, for example, stainless steel or aluminum. The hook can be integral to and comprise the same material as the hook body. The enlarged diameter ends can be permanently coupled to the retaining pin. The chain of the assembly can comprise stainless steel.

The present disclosure further includes a method of forming a hook and chain assembly comprising forming a hook body from a metal material comprising a top surface, a bottom surface, and a side surface, forming a chain opening in the top surface, forming a pin opening in the side surface comprising a central cavity having a dimension larger than the width of a chain, and a first cavity and a second cavity each comprising a shape and configuration corresponding to the shape of an enlarged diameter end of a retaining pin, forming a channel between the chain opening and the central cavity, passing the chain through the chain opening, the channel, and the pin opening such that a link of the chain is outside of the pin retaining opening, positioning a retaining pin within the link of the chain, and coupling an enlarged diameter end to either end of the retaining pin. The assembly can have a hook coupled to the bottom surface of the hook body, which can a food-safe metal, including, for example, stainless steel or aluminum. The hook body can be formed by casting or machining, for example. The hook can be formed simultaneously with the hook body. The hook body can comprise a food-safe material, such as stainless steel or aluminum. Further, the enlarged diameter ends can be permanently coupled to the retaining pin, such as, for example, by welding.

BRIEF DESCRIPTION OF THE DRAWINGS

The features and advantages of the present disclosure will become more apparent from the detailed description set forth below when taken in conjunction with the drawings, wherein:

FIGS. 3A and 3B illustrate a side view and a cross sectional view, respectively, of a hook and chain assembly in accordance with the present disclosure.

DETAILED DESCRIPTION OF THE ILLUSTRATED EMBODIMENTS

Figures 1A, 1B:
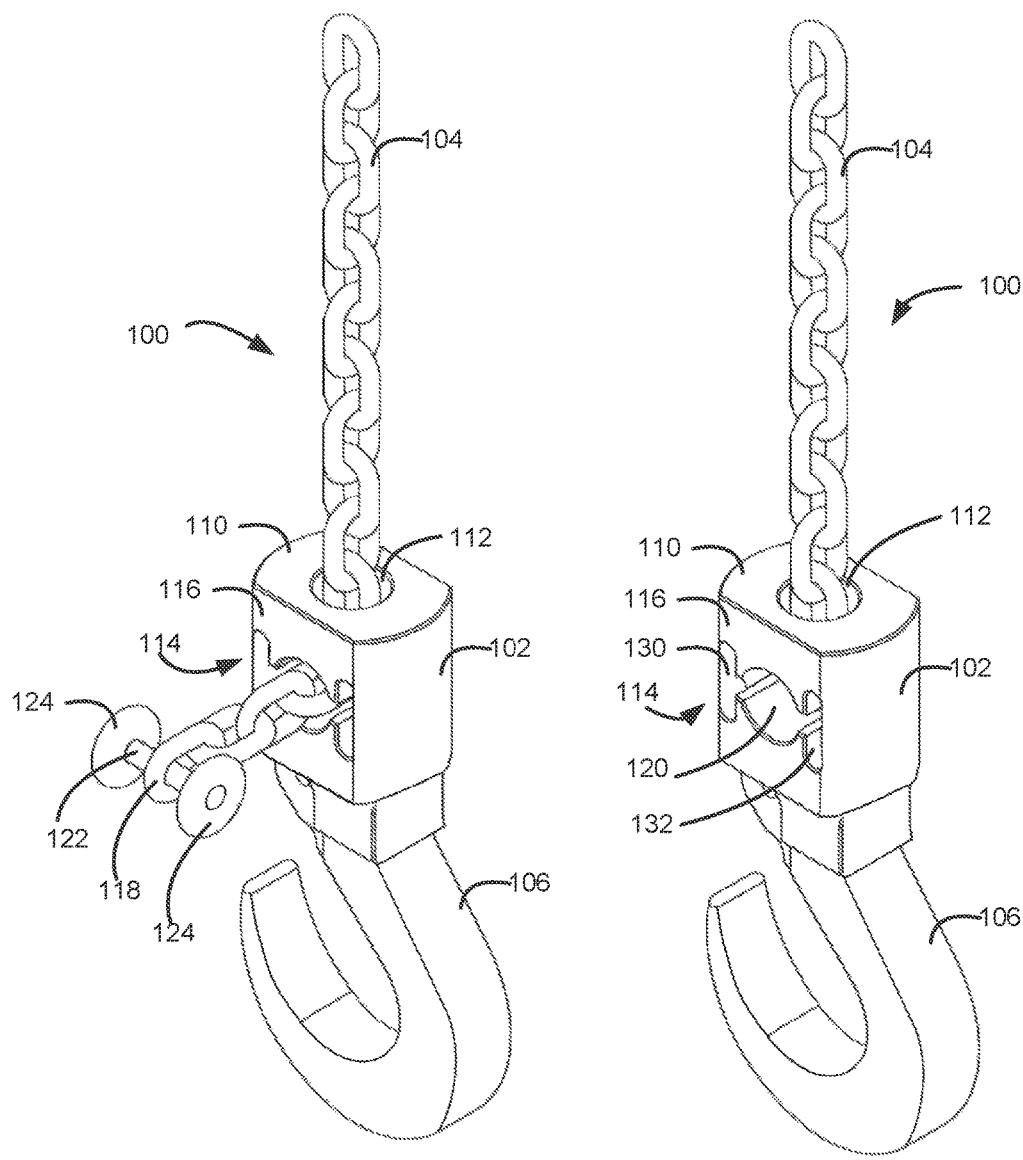
FIGS. 1A and 1B illustrate perspective views of a hook and chain assembly in accordance with the present disclosure.

Persons skilled in the art will readily appreciate that various aspects of the present disclosure can be realized by any number of methods and articles configured to perform the intended functions. Stated differently, other methods and articles can be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure may be described in connection with various principles and beliefs, the present disclosure should not be bound by theory.

For example, with initial reference to FIGS. 1A and 1B, a hook and chain assembly 100 in accordance with the present disclosure comprises a hook body 102 and a chain 104. In various embodiments, hook body 102 comprises an attachment 106 coupled to a rear face of hook body 102. For example, attachment 106 can comprise a hook, a ring, or other attachment capable of engaging hook and chain assembly with an object or article to be transported or otherwise manipulated. Although the present disclosure refers to hook 106, any suitable attachment for use with hook and chain assembly 100 is within the scope of the present disclosure.

In various embodiments, hook and chain assembly 100 is configured to engage with, hoist, and/or transport a heavy load, such as a bucket or a barrel. For example, hook and chain assembly 100 can be used to lift a large barrel of articles to be transported along a production line. In various embodiments, hook and chain assembly 100 is suitable for use in the food industry, including in the processing of produce, seafood, and prepared food products. Although described herein with reference to specific uses, any use of hook and chain assembly 100 is within the scope of the present disclosure.

In various embodiments, chain 104 passes through hook body 102 and is removably secured therein. Chain 104 can be easily removed from within hook body 102, allowing for relatively easy and quick cleaning, servicing, and sanitizing of the assembly, especially hook body 102. For example, in the food industry, cleaning and sanitizing are crucial, for, among other concerns, preventing contamination of food products with potentially harmful contaminants, toxins, and/or microorganisms. In various embodiments, chain 104 can be removed from hook body 102 and cleaned by steaming, pressure washing, chemical cleaning, or any other suitable method for sufficiently cleaning and/or sanitizing chain 104 and/or hook body 102. Further, in various embodiments, hook body 102 comprises no fasteners, and therefore, no threaded, recessed, or other types of holes within which toxins, microorganisms, or other contaminants may reside.

Hook body 102 can comprise, for example, a metal material. In various embodiments, hook body 102 comprises a food-safe material, such as stainless steel (including 304 and 316 stainless steels) or aluminum. Hook body 102 can comprise a metal sufficiently strong to lift, support, and/or transport a predetermined load. For example, hook body 102 can comprise a metal capable of supporting loads greater than 500 pounds, or further, greater than 1000 pounds, or further still, greater than 2000 pounds.

In various embodiments, hook body 102 comprises a single, relatively homogenous metal material. For example, hook body 102 can be cast from a single material. Further, hook body 102 can be machined from a block or billet of a single material. Any manner of forming a sufficiently strong hook body 102 is within the scope of the present disclosure.

Hook body 102 further comprises a hook 106. In various embodiments, hook 106 is made from the same material as, and is integral to, hook body 102. For example, hook 106 can be cast or machined simultaneously with and from the same material as hook body 102, such that hook body 102 and hook 106 are unitary. In other embodiments, hook 106 can be formed separately and affixed to hook body 102 in any suitable manner, such as, for example, welding. Any manner of coupling hook 106 to hook body 102 is within the scope of the present disclosure.

In various embodiments, hook body 102 comprises a chain opening 112. For example, chain opening 112 can comprise an opening in a top surface 110 of hook body 102 having a dimension large enough for chain 104 to pass through. In various embodiments, chain opening 112 is a relatively circular opening having a diameter of at least the width of a link of chain 104, which allows chain 104 to enter into hook body 102. However, chain opening 112 can comprise other shapes and configurations, including oval or non-circular.

Hook body 102 can further comprise a pin opening 114 through a side surface 116. For example, pin opening 114 can comprise a central segment 120 having a dimension large enough to allow chain 104 to pass through. In various embodiments, central segment 120 is open to a channel 126 within hook body 102. With reference to FIGS. 2B, and 3B, channel 126 can pass through hook body 102 and join chain opening 112 with central segment 120 of pin opening 114. Channel 126 can comprise a curved, right angle, or non-bent (i.e., straight) configuration joining central segment 120 and chain opening 112, and providing a path within hook body 102 through which chain 104 can pass.

In various embodiments, chain 104 can comprise a plurality of interlinked, torus-shaped metal links. For example, chain 104 can comprise a linked metal chain sufficiently strong to lift, support, and transport loads of over 500 pounds, and further, over 1,000 pounds, and further still, over 2,000 pounds. Chain 104 can comprise, for example, a food-safe material, such as stainless steel (including 304 and 316 stainless steels) or any other suitable food-safe metal.

Chain 104 comprises an end link 118. In various embodiments, end link 118 is the last link of chain 104, and is the link that passes through hook body 102. Hook and chain assembly 100 further comprises a retaining pin 122. For example, retaining pin 122 can pass through the body of end link 118.

In various embodiments, retaining pin 122 comprises two ends 124, each having a larger dimension than retaining pin 122. For example, retaining pin 122 can comprise a cylindrical pin, and each of ends 124 can comprise discs having a diameter larger than that of retaining pin 122. In various embodiments, ends 124 are circular discs, but any shape of ends 124 that has a dimension larger than that of retaining pin 122 is within the scope of the present disclosure.

Ends 124 can comprise, for example, a diameter larger than chain opening 112. Such diameters of ends 124 can prevent retaining pin 122 from passing through hook body 102, which would remove chain 104 from hook body 102.

In various embodiments, ends 124 can be coupled to retaining pin 122 after retaining pin 122 is passed through the body of end link 118. For example, ends 124 can be permanently coupled to retaining pin by, among other methods, welding. In other embodiments, ends 124 can be removably coupled to retaining pin, for example, by press fit, threaded fit, or any other suitable method of removably coupling.

Figure 2A:
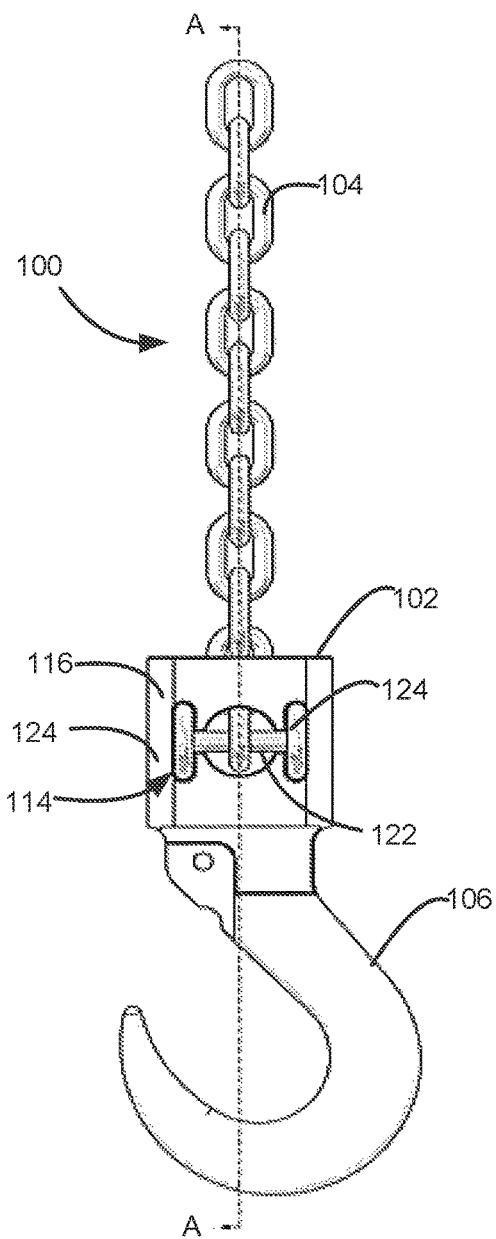
FIGS. 2A and 2B illustrate a side view and a cross sectional view, respectively, of a hook and chain assembly in accordance with the present disclosure.
Figure 2B:
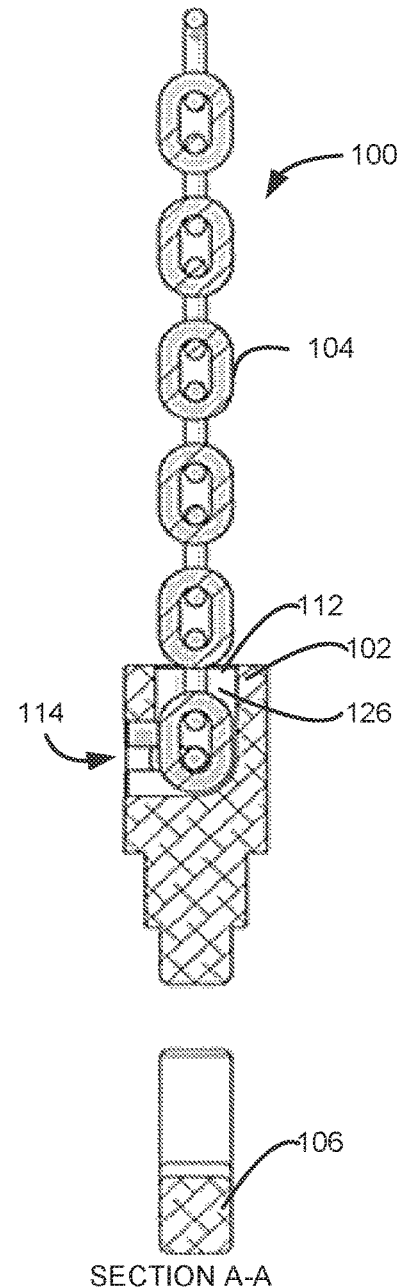

With reference to FIGS. 1A, 2A, and 3A, ends 124 can fit within and be supported by pin opening 114. For example, pin opening 114 can further comprise a first cavity 130 and a second cavity 132, one of each positioned on a side of central segment 120. In various embodiments, first cavity 130 and second cavity 132 comprise a shape that corresponds with the shape of ends 124 of retaining pin 122. Stated another way, first cavity 130 and/or second cavity 132 can comprise a negative of the shape of ends 124. For example, ends 124 can comprise discs having a larger diameter than retaining pin 122, and first cavity 130 and second cavity 132 can comprise a circular void that corresponds with the shape and size of ends 124.

Central segment 120, first cavity 130, and second cavity 132 can be positioned within hook body 102 such that when inserted, chain 104 and retaining pin 122 are centered within hook body 102. For example, centering pin opening 114 can allow for hook body 102 to hang plum relative to chain 104 (i.e., not angled or canted).

Ends 124 can comprise, for example, a diameter larger than central segment 120. Such diameters of ends 124 can prevent retaining pin 122 from passing through central opening 120 and hook body 102, which would remove chain 104 from hook body 102.

In various embodiments, and with particular reference to FIGS. 1A and 2A, after chain 104 is passed through hook body 102 and retaining pin 122 is installed within end link 118, chain 104 can be tightened and/or tensioned to cause retaining pin 122 to locate and secure within pin opening 114. This configuration is referred to as the "operational configuration," and allows for lifting, supporting, and/or transporting of heavy loads by hook and chain assembly 100.

Hook and chain assembly 100 can also be configured in a "cleaning configuration." For example, cleaning configuration comprises removing tension and/or load from hook 106, allowing end link 118 to be removed from within pin opening 114 and hook body 102. In the cleaning configuration, components of hook and chain assembly 100 can be cleaned and/or sanitized relatively quickly and easily. Such efficiency in cleaning and/or sanitized can reduce down time of the hook and chain assembly, as well as labor costs associated with cleaning the assembly.

In the present disclosure, the words "a" or "an" are to be taken to include both the singular and the plural. Conversely, any reference to plural items shall include, where appropriate, the singular.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size, and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

What is claimed is:

1. A chain and hook assembly comprising:
   a chain having a link;
   a retaining pin positioned within the link and having two enlarged diameter ends;
   a hook body comprising a top surface, a bottom surface, and a side surface,
      wherein the top surface comprises a chain opening through which the chain passes,
      wherein the side surface comprises a pin opening having a central cavity with a dimension larger than the width of the link, and a first cavity and a second cavity each having a shape and configuration corresponding to the shape of the enlarged diameter ends, and
      wherein the hook body further comprises a channel connecting the chain opening and the central cavity.

2. The assembly of claim 1, further comprising a hook coupled to the bottom surface of the hook body.

3. The assembly of claim 1, wherein the hook body comprises a food-safe metal.

4. The assembly of claim 3, wherein the hook body comprises one of stainless steel and aluminum.

5. The assembly of claim 2, wherein the hook is integral to and comprises the same material as the hook body.

6. The assembly of claim 1, wherein the enlarged diameter ends are permanently coupled to the retaining pin.

7. The assembly of claim 1, wherein the chain comprises stainless steel.

8. A method of forming a hook and chain assembly comprising:
   forming a hook body from a metal material comprising a top surface, a bottom surface, and a side surface;
   forming a chain opening in the top surface;
   forming a pin retaining opening in the side surface comprising a central cavity having a dimension larger than the width of a chain, and a first cavity and a second cavity each comprising a shape and configuration corresponding to the shape of an enlarged diameter end of a retaining pin;
   forming a channel between the chain opening and the central cavity;
   passing the chain through the chain opening, the channel, and the pin retaining opening such that a link of the chain is outside of the pin retaining opening;
   positioning a retaining pin within the link of the chain; and
   coupling an enlarged diameter end to either end of the retaining pin.

9. The method of claim 8, further comprising forming a hook coupled to a bottom surface of the hook body.

10. The method of claim 8, wherein the enlarged diameter ends are permanently coupled to the retaining pin.

11. The method of claim 10, wherein the enlarged diameter ends are welded to the retaining pin.

12. The method of claim 8, wherein forming the hook body comprises casting or machining the hook body.

13. The method of claim 9, wherein forming the hook coupled to the bottom surface of the hook body comprises forming the hook simultaneous to forming the hook body.

14. The method of claim 8, wherein the hook body comprises a food-safe metal.

15. The method of claim 8, wherein the hook body comprises stainless steel or aluminum.

16. The method of claim 8, wherein the chain comprises stainless steel.

* * * * *